Aug. 16, 1927.
J. R. GAMMETER
1,639,430
METHOD AND APPARATUS FOR MAKING HOLLOW RUBBER ARTICLES
Filed March 20, 1924
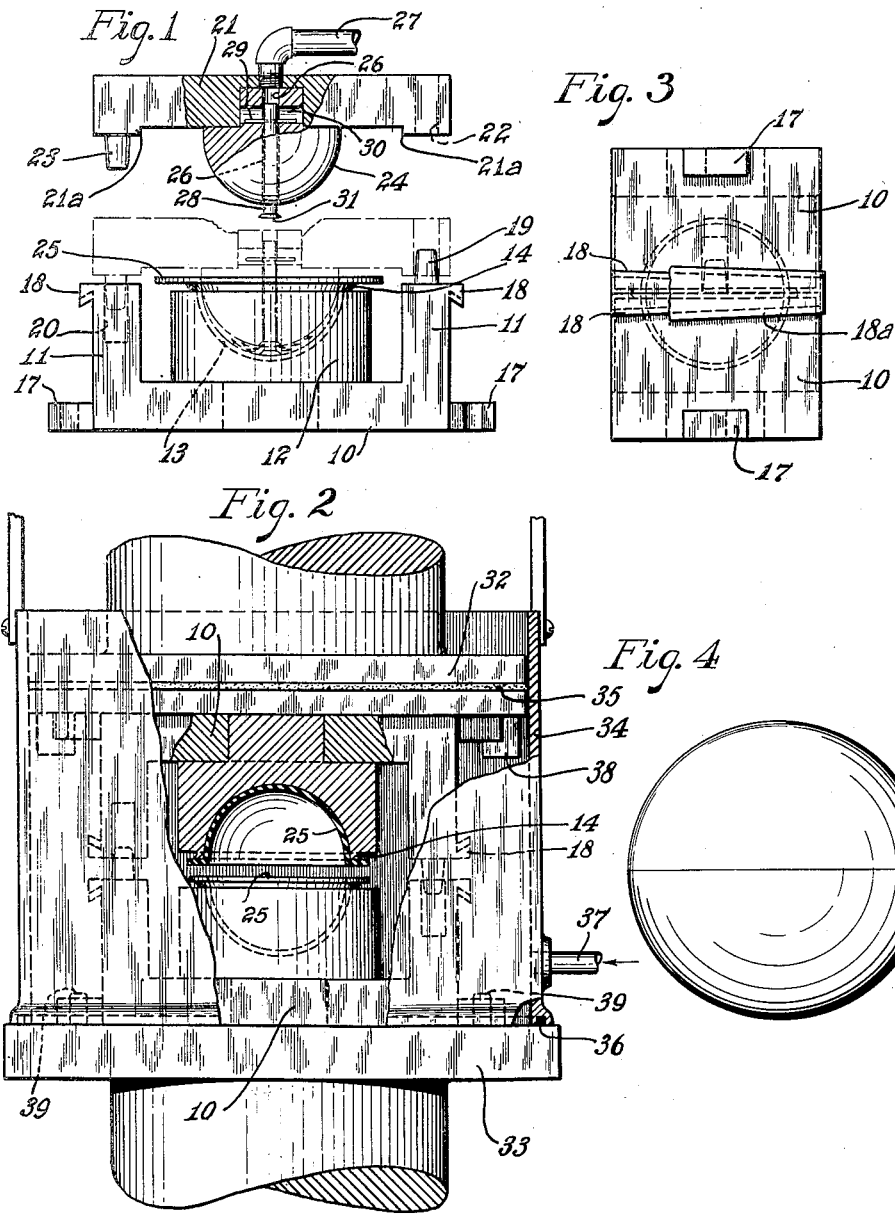
Inventor
John R. Gammeter.
By Robert M. Pierson
Atty.

Patented Aug. 16, 1927.

1,639,430

UNITED STATES PATENT OFFICE.

JOHN R. GAMMETER, OF AKRON, OHIO, ASSIGNOR TO THE B. F. GOODRICH COMPANY, OF NEW YORK, N. Y., A CORPORATION OF NEW YORK.

METHOD AND APPARATUS FOR MAKING HOLLOW RUBBER ARTICLES.

Application filed March 20, 1924. Serial No. 700,513.

This invention relates to the manufacture of hollow rubber articles, and more particularly imperforate, hollow, rubber balls or the like containing air or a gas at super-atmospheric pressure, as in the case of children's play balls or tennis balls, for example.

To prevent a formed, hemi-spherical blank of plastic material, such as unvulcanized rubber, from being dislodged from the female die or mold as the male die is withdrawn, and to hold the blank in the mold after the male die is withdrawn, it heretofore has been common practice to apply suction to the mold cavity, and suction also has sometimes been employed to draw the material into the cavity. Another expedient has been to preform the blanks, insert them in suitable mold sections, and then bring the latter together to unite the blanks as a hollow article. Semi-curing of the formed parts previous to assembling, to cause them to lie snugly in the mold, also has been resorted to. All of such methods, however, are relatively expensive.

My chief object is to provide a method and apparatus whereby the forming, assembling, and inflating of the articles may be more economically accomplished than heretofore. A more specific object is to provide improved apparatus and procedure whereby the constituent parts of the article may be formed from flat sheets of plastic material which have not previously been shaped or formed, such parts retained within their forming molds or dies without the special application of suction for this purpose, and then united in a chamber containing air or other gas at super-atmospheric pressure, and then vulcanized in the mold parts in which they are originally formed.

Of the accompanying drawings:

Fig. 1 is a side elevation of apparatus for forming the respective halves of a hollow ball, in accordance with my invention, and the work therein, part being broken away and in section.

Fig. 2 is a view in section and elevation of a pressure chamber and the apparatus of Fig. 1 therein.

Fig. 3 is an elevation of a pair of the mold members closed and clamped upon the work, and ready for the vulcanizer.

Fig. 4 is a view of the finished article.

Referring to the drawing, the apparatus comprises a U-shaped support or mold frame 10 and a preferably cylindrical mold section 12 mounted, with substantial clearance, between the legs 11, 11 thereof. The mold cavity therein, 13, is surrounded by a flat-faced cutting flange 14 formed on the mold section and having its upper face in alignment with the top faces of the frame legs, said face being adapted to have the stock pressed firmly thereon to form a seal, without initially severing the stock. The frame legs are formed at their base with external, slotted, attachment lugs 17, 17, and at their upper ends with laterally extending, undercut, wedgeshaped clamping lugs 18, 18, adapted to be engaged by a drift key such as is shown at 18ª in Fig. 3. The top faces of said frame legs 11 are provided with the usual dowels and dowel apertures 19, 20 respectively.

The mold section 10 is adapted to be mounted upon the table of a suitable press (not shown), to the reciprocating head of which is secured a die-support 21 having a dowel aperture 22 and dowel 23 adapted to register with complemental parts of the mold frame 10, and having a hemi-spherical die 24 extending downwardly from its center and adapted to enter the mold cavity 13 to shape therein a sheet of plastic, unvulcanized rubber 25 positioned over said cavity and resting upon the cutting edge 14 surrounding the same, the die support 21 being formed with bosses 21ª, 21ª adapted to abut the respective legs 11 of the mold frame 10 to prevent the flange 14 from severing the stock in the closing of the press, but to permit the stock to be pressed against the flange to form a tight fluid seal of the stock therewith.

The die 24 is formed with an axial bore 26 (Fig. 1) communicating with a source of pressure fluid through a pipe 27 mounted on the support 21, and in said bore is mounted a loose-fitting plunger 28, supported and permitted limited axial movement therein by means of a transverse pin 29 extending through the upper end portion of its structure and into a slot 30 at each side thereof formed in the attaching stem of the die. The lower end of the plunger 28 is formed with a flared, spherically convex head 31 adapted to seat in a complemental flared end portion of the bore 26, so that when it is so seated the die will present a smooth, uninterrupted surface to the work. The plunger 28 is sufficiently loose-fitting to permit the passage of a fluid about it through the bore 26.

For uniting the two halves of the article in an atmosphere of compressed air or other desired medium under pressure, I provide suitable apparatus including a stationary, upper platen 32, a vertically movable lower platen 33, and a vertically movable, open-ended, tubular casing 34, adapted to be telescoped with the upper, stationary platen 32 and to rest upon the lower platen 33, a gasket 35 on the upper platen sealing it against the inner surface of the casing 34, and a gasket 36 on the lower edge of the casing, sealing the latter to the lower platen 33. Said platens and casing are thus adapted to be readily assembled to provide a fluid-tight chamber. A supply pipe 37 extends through the wall of the casing, for introducing fluid under pressure into said chamber.

The lower face of the upper platen 32 is provided with a pair of spaced-apart, L-shaped supporting brackets 38, 38 adapted to support and position one of the mold sections 10 in inverted position, by engagement with its respective lugs 17, and the lower platen 33 has its top face provided with suitably positioned studs 39, 39 for positioning a similar mold section 10, in upright position, by engagement with the slots in the respective lugs 17 at each of its ends.

For convenience, I have shown and described a single cavity mold and single die, but I do not limit myself thereto, as it will be obvious that my apparatus is equally applicable where multiple-cavity molds and a plurality of dies are used.

In the manufacture of balls by this apparatus, I first place a sheet of unvulcanized rubber stock of the required gauge over the cavity 13 after which the die 24 is moved downward into engagement therewith to press said sheet into said cavity to form a hemi-spherical blank, and retracted. Before the die 24 is retracted, pressure fluid, preferably air, is admitted through the pipe 27, so that as the die is withdrawn the plunger 28, impelled by the pressure fluid, remains momentarily in contact with the work, pressing its central portion against the mold, while the pressure fluid, issuing from the bore 26, about the plunger, breaks the seal between the die and the stock and effects separation of the two. The blank being pressed and thus sealed against the flange 14, is retained in the mold by its own suction, which is to say by the atmospheric pressure alone on its exposed face.

Two such mold sections with their cavities thus lined with unvulcanized rubber are then mounted on the respective upper and lower platens, 32, 33 of a suitable press, as shown in Fig. 2, the casing 34 being sufficiently raised to permit it, and if desired, a small quantity of a suitable substance, such as water, may be placed in the lower blank to increase the internal pressure of the article during vulcanization. The casing is then lowered until it rests upon the lower platen, thus forming a fluid-tight chamber, and compressed air or other suitable gas is admitted to said chamber through the supply-pipe 37.

The lower platen 33 is then raised, closing the mold sections toward each other until the margins of the rubber hemispheres therein are brought forcibly together, and their outwardly-turned marginal portions pressed between the respective cutting edges 14, which seal together and substantially sever the same. The uniting of the two halves of the article entraps a quantity of the fluid under pressure in the chamber, so that the finished ball will have a corresponding internal pressure.

The pressure within the chamber is then released and the casing 34 raised to give access to the mold, and the drift keys 18$^a$ are applied to lock the mold sections in closed relation. The platen 33 is lowered, the assembled mold removed, and the surplus rubber, substantially severed by the cutting flanges 14, may be removed. The mold is then placed in a suitable vulcanizer and the article therein vulcanized in the usual manner, after which any fin or rand on the molded ball may be removed by any suitable means, leaving the finished ball as shown in Fig. 4.

The tubular casing 34 is not subjected to air pressure tending strongly to move it in an axial direction, wherefore it does not require to be permanently secured to either of the other two members with which it encloses the pressure chamber, and this provides for easy and ready handling of these parts to open and close the chamber and to provide access for mounting and removing the mold sections.

Modifications may be resorted to within the scope of my invention, and I do not wholly limit my claims to the exact procedure described or the specific construction shown.

I claim:

1. The method of forming and retaining plastic sheet material within a mold cavity which comprises pressing said material into conformity with said cavity, and holding it therein by mechanical pressure at a central part of its area while withdrawing the pressing means from another part of its area.

2. The method of forming and retaining plastic material within a mold cavity, which comprises pressing a sheet of said material into conformity with said cavity, and then forcing fluid under pressure between said material and the presser member as the latter is withdrawn.

3. The method of forming and retaining plastic material within a mold cavity, which comprises pressing a sheet of said material into conformity with said cavity, and then forcing fluid under pressure between said material and the presser member, and applying mechanical pressure upon a portion of said material as said presser member is withdrawn.

4. In apparatus for forming hollow articles, the combination of a mold section formed with a cavity, a movable die aligned with the latter and adapted to cooperate therewith to form a piece of plastic material, and means carried by said die and adapted to remain temporarily in contact with the formed material as said die is withdrawn, to prevent displacement of said material.

5. In apparatus for forming hollow articles, the combination of a mold section formed with a cavity, a die aligned with the latter and adapted to form a piece of plastic material therein, said die being formed with an axial bore, a plunger in said bore, and means for urging said plunger against the work as said die is withdrawn therefrom.

6. In apparatus for forming hollow articles, the combination of a mold section formed with a cavity, a die aligned with said cavity and adapted to press a sheet of plastic material into conformity therewith, said die being formed with an axial bore, a plunger in said bore, means for urging said plunger against the work as said die is withdrawn, and means for withdrawing said plunger after said die has withdrawn a determinate distance.

7. In apparatus for forming hollow articles, the combination of a mold section formed with a cavity, a die aligned with said cavity and adapted to press a sheet of material into conformity therewith, said die being formed with an axial bore, and means for injecting fluid under pressure through said bore into contact with the work.

8. In apparatus for forming hollow articles, the combination of a mold section formed with a cavity, a die aligned therewith and adapted to press a sheet of plastic material into said cavity, said die being formed with an axial bore, a loose-fitting plunger mounted therein, and means for injecting fluid under pressure past said plunger and into contact with the work as said die is withdrawn.

9. In apparatus for forming hollow articles, the combination of a mold section formed with a cavity, a die aligned therewith and formed with an axial bore, a loose-fitting plunger mounted in said bore and formed with an end face adapted to lie flush with the face of said die, and means for applying a pressure fluid to the opposite end of said bore to urge said plunger toward projected position, said bore being adapted to permit the passage of fluid therethrough about said plunger.

10. In apparatus for making imperforate hollow articles, the combination of a pair of mold sections adapted, upon being brought together, to unite two hollow blanks of plastic material contained in their respective cavities, press members adapted to force said mold sections together, and means for confining pressure fluid about said mold sections as they are thus closed, said means comprising a tubular structure adapted to be telescoped with one of said press members and to seat on the other, and means for sealing said tubular structure against the respective press members.

11. The method of making a hollow article of plastic material which comprises molding it between a female mold member and a male die member and injecting fluid between the latter and the article so as to break the suction between the two and leave the article held in the female mold member by its own suction.

In witness whereof I have hereunto set my hand this 18th day of March, 1924.

JOHN R. GAMMETER.